Patented Jan. 22, 1935

1,988,799

UNITED STATES PATENT OFFICE 1,988,799

MANUFACTURE OF MANGANESE DIOXIDE

Yogoro Kato, Ebara-Gun, Tokyo-Fu, Japan, assignor of fifty per cent to Kaoru Oyama, the representative director of Yuasa Storage Battery Company, Ltd., Osaka-Fu, Japan No Drawing. Application February 25, 1929
Serial No. 342,679

1 Claim. (Cl. 23—145)

The invention relates to the manufacture or production of manganese dioxide ($MnO_2$), from the lower oxides of manganese. My object is the successful and inexpensive production of manganese dioxide, especially for use in dry batteries.

The higher oxide of manganese, i. e., manganese dioxide, is extensively used in dry batteries as a depolarizer and the market demand for it is very large. Attempts to produce manganese dioxide by oxidizing lower oxides of manganese by passing oxygen over the latter have hitherto been unsuccessful. I have discovered that any lower oxide of manganese, whether natural or artificial, if heated to moderately high temperatures in the presence of one or more alkalies and supplied with oxygen, whether free oxygen, or with any gas containing oxygen, such as air, can very readily and inexpensively be converted into manganese dioxide. The alkali acts as a catalyzer.

By "lower oxide of manganese", I mean any oxide that contains three or less oxygen atoms with two manganese atoms, and which is not a depolarizer. By "manganese dioxide", I mean the oxide of tetravalent manganese, which has depolarizing power, and other oxidizing power, and to a marked degree. In substances that can be converted into oxide of manganese by heating, I include carbonate, or hydroxide of manganese, or any other natural or artificial manganese compound containing carbonate or hydroxide.

Natural manganese oxide ores are usually found in states of varying degree of oxidation, the ratio of oxygen atoms to one atom of manganese ranging between one and two. By my invention almost all manganese in these ores can be converted into manganese dioxide.

For the successful practice of my invention, it is not necessary that either natural or artificial manganese oxide be pure. The presence of ordinary impurities such as silica, or iron oxides, etc., when they are not combined chemically with manganese, does not interfere with oxidation of the manganese into the dioxide.

I have found that when steam is added to the oxygen, oxidation seems to be greatly accelerated.

One outstanding advantage of the oxidizing process in my invention lies in the fact that the chemical action is exothermic so that heat required for the oxidation is much reduced.

By my invention manganese dioxide can be produced from a lower oxide or oxides of manganese, or from any manganese compound that can be converted into the oxide by heat, by heating said oxide or manganese compound in the presence of an alkali to temperatures above 200° C. This temperature is below that at which the manganese dioxide will decompose and above that at which no reaction will occur.

By the term "alkali", for the purpose of my invention, I include any compound including oxides, hydroxides, and carbonates of alkali, or alkaline earths, and also any compounds that may be converted into the same, as by heating.

By way of illustration, I shall mention three practical examples of the application or practice of my invention.

*Example No. 1.*—To one kilogram of powdered lower oxide of manganese, or of any powdered natural or artificial manganese substance that may be converted into such oxide upon heating, add thirty grams of sodium hydroxide or fifty grams of sodium carbonate and mix thoroughly. Place the mixture into a cylindrical container and externally heat the container, electrically or otherwise. Rotate the container while heating and introduce therein oxygen, or air for oxidation, for one or two hours. When oxidation is terminated, remove the product and wash with water, and, if necessary, with dilute acid solution.

*Example No. 2.*—Into the rotating cylinder containing raw material and alkali, as specified in Example No. 1, introduce oxygen-containing flame, i. e., oxidizing flame. This saves external heating. When oxidation is terminated remove the contents and wash as in Example No. 1.

*Example No. 3.*—Place the raw material and alkali as specified in Example No. 1 into a reverberatory furnace. Agitate the contents and at the same time subject the same to an oxidizing flame. When oxidation is terminated, remove and wash the product.

In all three above examples oxidation commences at a temperature above 200° C. and is most active at or around 500° C.

When alkaline earth compounds are used in place of alkalies, they may be removed after oxidation, by washing with dilute acid.

In all the cases given the alkali used may be added at first to a portion of the lower oxide of manganese and heated in presence of oxygen, in which case manganese dioxide will be produced. To this latter the remaining portion of manganese compound may then be added. Also the alkali and manganese compounds may be added alternately. In either case the object of my invention can be attained.

I claim:—

A process of manufacturing manganese dioxide in which natural or artificial lower oxide of manganese or any compound of manganese that may be converted into the lower oxide by heating is heated in a dry state, in the presence of substantially 3 to 5% of an alkali metal or alkaline earth metal compound selected from the group consisting of the oxides, hydroxides, carbonates, or compounds convertible by heating into the same, to a temperature of 200° C. or higher, whilst passing over it gas containing free oxygen and thus converting the lower manganese oxide into manganese dioxide.

YOGORO KATO.